(12) United States Patent
Lei et al.

(10) Patent No.: US 12,476,396 B2
(45) Date of Patent: Nov. 18, 2025

(54) CONDUCTIVE TERMINAL WITH MAGNET PROVIDING THE CONVINIENCE AND SAFE ELECTRICAL CONNECTION

(71) Applicant: SHENZHEN CARKU TECHNOLOGY CO., LIMITED, Guangdong (CN)

(72) Inventors: Yun Lei, Guangdong (CN); Yidan Hu, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 365 days.

(21) Appl. No.: 18/174,156

(22) Filed: Feb. 24, 2023

(65) Prior Publication Data

US 2023/0216224 A1 Jul. 6, 2023

Related U.S. Application Data

(63) Continuation of application No. PCT/CN2020/110799, filed on Aug. 24, 2020.

(51) Int. Cl.
*H01R 11/30* (2006.01)
*H01R 13/62* (2006.01)
(Continued)

(52) U.S. Cl.
CPC ......... *H01R 11/30* (2013.01); *H01R 13/6205* (2013.01); *H02J 7/0042* (2013.01); *H01R 13/514* (2013.01)

(58) Field of Classification Search
CPC .............................. H01R 11/30; H01R 13/6205
(Continued)

(56) References Cited

U.S. PATENT DOCUMENTS

| 4,390,232 A * | 6/1983 | Jamgotchian | ........ H01R 11/287 439/38 |
| 4,609,238 A * | 9/1986 | Jamgotchian | .......... H01R 11/30 439/727 |

(Continued)

FOREIGN PATENT DOCUMENTS

| CN | 104752876 A | 7/2015 |
| CN | 104916963 A | 9/2015 |

(Continued)

OTHER PUBLICATIONS

The first office action issued in corresponding CN application No. 202080062125.0 dated Jun. 15, 2023.

(Continued)

*Primary Examiner* — Hae Moon Hyeon
(74) *Attorney, Agent, or Firm* — HAUPTMAN HAM, LLP

(57) ABSTRACT

Implementations of the disclosure provide a conductive terminal. The conductive terminal is configured to be disposed at an end of a conductive wire and electrically coupled to an electrode member. The conductive terminal includes a conductive member and a magnetic member. The conductive member includes a connection frame configured to be electrically coupled to the conductive wire. The magnetic member is received in the connection frame. Implementations of the disclosure further provide a connector, a charger, and an emergency starting power supply.

20 Claims, 5 Drawing Sheets

(51) Int. Cl.
*H02J 7/00* (2006.01)
*H01R 13/514* (2006.01)

(58) Field of Classification Search
USPC .................................. 439/38, 39, 754, 755
See application file for complete search history.

(56) References Cited

U.S. PATENT DOCUMENTS

| | | | | |
|---|---|---|---|---|
| 4,838,797 | A * | 6/1989 | Dodier | H01F 38/14 |
| | | | | 439/38 |
| 4,917,612 | A * | 4/1990 | Priest | H01R 11/30 |
| | | | | 439/38 |
| 5,779,487 | A * | 7/1998 | Gatin | H01R 11/287 |
| | | | | 439/522 |
| 7,741,806 | B2 * | 6/2010 | Kuhlmann | H02J 7/0042 |
| | | | | 439/38 |
| 9,728,867 | B2 * | 8/2017 | Allen | H01R 11/281 |
| 10,658,789 | B1 * | 5/2020 | Wang | H01R 24/28 |
| 2015/0079811 | A1 * | 3/2015 | Yi | H01R 11/24 |
| | | | | 439/38 |
| 2022/0209369 | A1 * | 6/2022 | Pavlinsky | H01M 10/425 |

FOREIGN PATENT DOCUMENTS

| | | | | |
|---|---|---|---|---|
| CN | 106505363 | A * | 3/2017 | ............ A41D 1/005 |
| CN | 106558784 | A * | 4/2017 | ............ H01R 11/30 |
| CN | 207705538 | U | 8/2018 | |
| CN | 109075499 | A | 12/2018 | |
| WO | 2017186097 | A1 | 11/2017 | |
| WO | 2019075151 | A1 | 4/2019 | |

OTHER PUBLICATIONS

WIPO, International Search Report and Written Opinion for International Application No. PCT/CN2020/110799, May 25, 2021.
The first office action issued in corresponding CA application No. 3,126,403 dated Nov. 18, 2022.

* cited by examiner

A-A

CONDUCTIVE TERMINAL WITH MAGNET PROVIDING THE CONVINIENCE AND SAFE ELECTRICAL CONNECTION

CROSS-REFERENCE TO RELATED APPLICATION(S)

This application is a continuation of International Application No. PCT/CN2020/110799, filed on Aug. 24, 2020, the entire disclosure of which is hereby incorporated by reference.

TECHNICAL FIELD

This disclosure relates to the technical field of electricity, and more particularly to a conductive terminal, a connector, and a charger.

BACKGROUND

With the development of industry, electric energy has penetrated into various aspects of people's lives. The invention of energy storage devices has greatly promoted the development of various electrical appliances. The emergence of the electric energy has improved people's living standards and accelerated the technological development. Since the electric energy is a kind of green energy, which is renewable and has no carbon emissions, the electric energy has gradually become a high-quality energy that is widely promoted.

The existing energy storage devices are generally batteries or storage batteries, which are widely used in most industries. Most of the storage batteries on the market are packaged. The packaged storage battery merely exposes electrodes. During use of the storage battery, the exposed electrodes are coupled to a conductive terminal to achieve charging or discharging of the storage battery. However, the existing conductive terminal is generally a conductive clamp. When in use, a relatively large clamping force may be exerted to the conductive clamp. In addition, during establishing the connection between the conductive clamp and the electrodes of the storage battery, the conductive clamp needs to be manually held to clamp the electrodes of the storage battery, which is easy to cause safety accidents. Therefore, how to improve the convenience and safety of the connection between the electrodes of the storage battery and the conductive terminal is a problem to be solved.

SUMMARY

In view of the above, implementations of the disclosure provide a conductive terminal, a connector, and a charger, which can provide the convenience and safety of the connection between the electrodes of the storage battery and the conductive terminal.

Implementations of the disclosure provide a conductive terminal. The conductive terminal is configured to be disposed at an end of a conductive wire and electrically coupled to an electrode member. The conductive terminal includes a conductive member and a magnetic member. The conductive member includes a connection frame configured to be electrically coupled to the conductive wire. The magnetic member is received in the connection frame.

Implementations of the disclosure further provide a connector. The connector includes a conductive wire, a first connection port located at one end of the conductive wire, and a second connection port located at the other end of the conductive wire. The first connection port is coupled to an output port of a starting power supply, and the second connection port is configured to be coupled to a car battery. The second connection port comprises the conductive terminal described in any above implementation, and the conductive terminal is configured to be electrically coupled to an electrode member of the car battery.

Implementations of the disclosure further provide a charger for charging a car battery. The charger includes a plug, a conductive wire, and the conductive terminal described in any above implementation. One end of the conductive wire is coupled to the plug, and the other end of the conductive wire is coupled to the conductive terminal. The plug is configured to be coupled to an external charging power supply, and the conductive terminal is configured to be electrically coupled to an electrode member of the car battery to charge the car battery.

According to implementations provided herein, the conductive terminal includes the magnetic member and the conductive member. The conductive member includes the connection frame. The connection frame is used for receiving the magnetic member. The connection frame is driven to be adsorbed to the electrode member via magnetic adsorption force of the magnetic member, so that current can flow from the electrode member to the conductive wire via the connection frame. That is, the magnetic member provides a guiding force for the coupling between the conductive member and the electrode member, which may improve the efficiency of the coupling between the conductive terminal and the electrode member, thereby facilitating the plugging between the conductive terminal and the electrode member. In addition, since there is no need to manually hold the conductive terminal to realize the coupling between the conductive terminal and the electrode member, the safety of the use of the conductive terminal can be improved.

BRIEF DESCRIPTION OF THE DRAWINGS

In order to describe technical solutions of implementations or the related art more clearly, the following will give a brief description of accompanying drawings used for describing the implementations or the related art. Apparently, the accompanying drawings described below merely illustrate some implementations. Those of ordinary skill in the art can also obtain other accompanying drawings based on the accompanying drawings described below without creative efforts.

DETAILED DESCRIPTION

Hereinafter, technical solutions embodied in implementations of the disclosure will be described in a clear and comprehensive manner in conjunction with the accompanying drawings. It is obvious that implementations described herein are merely some rather than all the implementations of the disclosure. All other implementations obtained by those of ordinary skill in the art based on the implementations of the disclosure without creative efforts shall fall within the protection scope of the disclosure.

Figure 1:
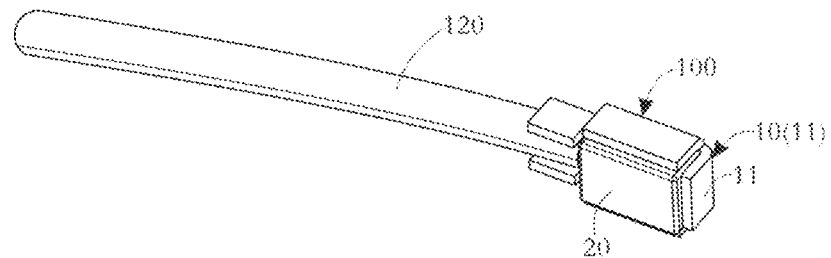
FIG. 1 is a perspective view of a conductive terminal according to implementations of the disclosure.
Figure 2:
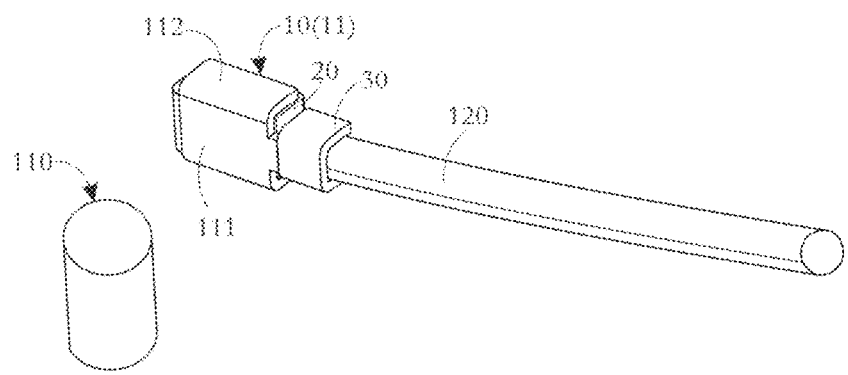
FIG. 2 is a perspective view of the conductive terminal in FIG. 1, viewed from another viewpoint.

FIG. 1 is a perspective view of a conductive terminal 100 according to implementations of the disclosure. FIG. 2 is a perspective view of the conductive terminal 100 in FIG. 1, viewed from another viewpoint.

As illustrated in FIG. 1 and FIG. 2, the conductive terminal 100 provided in an implementation of the disclosure is configured to be disposed at an end of a conductive wire 120 and electrically coupled to an electrode member 110. The conductive terminal 100 includes a magnetic member 20 and a conductive member 10. The conductive member 10 includes a connection frame 11, and the magnetic member 20 is received in the connection frame 11. The connection frame 11 is configured to be electrically coupled to the conductive wire 120.

In the implementation, the conductive terminal 100 is disposed at the end of the conductive wire 120. The conductive terminal 100 includes the magnetic member 20 and the conductive member 10. The conductive member 10 includes the connection frame 11. The connection frame 11 is used for receiving the magnetic member 20. The connection frame 11 is driven to be adsorbed to the electrode member 110 via magnetic adsorption force of the magnetic member 20, so that current can flow from the electrode member 110 to the conductive wire 120 via the connection frame 11. That is, the magnetic member 20 provides a guiding force for the coupling between the conductive member 10 and the electrode member 110, which may improve the efficiency of the coupling between the conductive terminal 100 and the electrode member 110, thereby facilitating the coupling/decoupling between the conductive terminal 100 and the electrode member 110. In addition, since there is no need to manually hold the conductive terminal 100 to realize the coupling between the conductive terminal 100 and the electrode member 110, the safety of the use of the conductive terminal 100 can be improved.

In the implementations, the conductive wire 120 generally includes an inner layer and an outer layer, where the inner layer is a metal cable and the outer layer is a plastic insulation layer. The conductive terminal 100 is configured to be coupled to one end of the conductive wire 120.

The electrode member 110 is made of metal material, protrudes from a surface of an energy storage device, and is coupled to positive and negative cores inside the energy storage device. The electrode member 110 illustrated in FIG. 2 may be an electrode column protruding from the energy storage device. The energy storage device includes but is not limited to a car battery.

Figure 11:
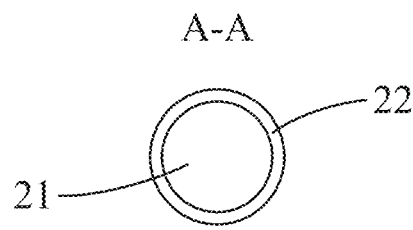
FIG. 11 is a schematic cross-sectional view of a magnetic member in FIG. 10, taken along line A-A.

As illustrated in FIG. 11, the magnetic member 20 includes a magnet 21 and an insulation layer 22 wrapping the magnet 21. The magnet 21 may be a permanent magnet. The insulation layer 22 is configured to isolate current conduction between the magnet and the conductive member 10, so as to avoid decrement in magnetic property of the magnet 21 after the current flows to the magnet 21.

The conductive member 10 is generally made of metal material, or a metal layer can be plated on a surface of the conductive member 10. For example, the conductive member 10 is made of iron, and the surface of the conductive member 10 is plated with copper to facilitate current conduction.

Figure 3:
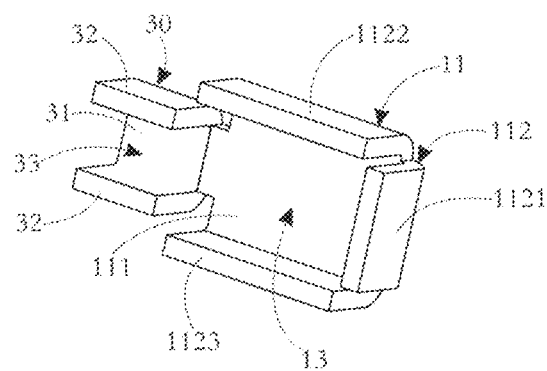
FIG. 3 is a perspective view of a conductive member of the conductive terminal of FIG. 1 with the magnetic member being removed.

FIG. 3 is a perspective view of a conductive member 10 of the conductive terminal 100 of FIG. 1 with the magnetic member 20 being removed.

As illustrated in FIG. 2, the conductive member 10 includes the connection frame 11. The connection frame 11 is used for receiving the magnetic member 20. The connection frame 11 includes a connection plate 111 and side plates 112 protruding from edges of the connection plate 111.

As illustrated in FIG. 3, the connection plate 111 and the side plates 112 collectively define a receiving groove 13, and the magnetic member 20 is received in the receiving groove 13. A side surface(s) of the connection frame 11 away from the magnetic member 20 is configured to be electrically coupled to the electrode member 110, such that current can flow to the conductive member 10 via the conductive wire 120 and then flow to the electrode member 110 via the conductive member 10. In one example, a side surface of the connection plate 111 away from the receiving groove 13 or a surface(s) of the side plates 112 away from the receiving groove 13 is configured to be electrically coupled to the electrode member 110. The side surface of the connection plate 111 or the side surface(s) of the side plate 112 away from the receiving groove 13 is plated with a metal layer, and the metal layer is configured to be in contact with the electrode member 110 to conduct current.

The connection plate 111 is in the shape of a rectangle, and a plate surface of the connection plate 111 extends toward the conductive wire 120. A first side plate 1121 protrudes from a side edge of the connection plate 111 away from the conductive wire 120. A second side plate 1122 and a third side plate 1123 respectively protrude from two opposite sides of the connection plate 111 arranged between the conductive wire 120 and the first side plate 1121.

The first side plate 1121, the second side plate 1122, and the third side plate 1123 respectively extend from the edges of the connection plate 111 and extend toward the same side of the connection plate 111. The first side plate 1121, the second side plate 1122, the third side plate 1123, and the connection plate 111 collectively define the receiving groove 13. The receiving groove 13 is used for receiving the magnetic member 20.

As one example, the first side plate 1121, the second side plate 1122, and the third side plate 1123 are spaced apart from each other, that is, there is a gap between adjacent side plates. The first side plate 1121, the second side plate 1122, the third side plate 1123, and the connection plate 111 are integrally formed by punching and bending a metal plate, thereby facilitating manufacturing and saving costs. In addition, it can ensure that the connection frame 11 has a same thickness everywhere, such that the connection frame 11 is not easy to wear.

As another example, the first side plate 1121, the second side plate 1122, and the third side plate 1123 are continuously arranged. During manufacturing, the first side plate 1121, the second side plate 1122, and the third side plate 1123 are integrally formed by stamping the metal plate with a stamping process, such that production costs can be saved.

As yet another example, the first side plate 1121, the second side plate 1122, and the third side plate 1123 are respectively welded with the edges of the connection plate 111.

In addition, in one example, the first side plate 1121, the second side plate 1122, and the third side plate 1123 each are provided with a tooth-like protrusion on a side surface toward the connection plate 111. The tooth-like protrusion faces the receiving groove 13. The tooth-like protrusion is used for clamping the magnetic member 20 to prevent the magnetic member 20 from leaving the receiving groove 13.

In another example, a side surface of the magnetic member 20 facing the connection plate 111 is welded with the connection plate 111, to enable the magnetic member 20 to be received in the receiving groove 13.

In one example, the connection frame 11 further includes a fourth side plate parallel to the connection plate 111. The fourth side plate is located at an opening of the receiving groove 13. One side of the first side plate 1121, one side of the second side plate 1122, and one side of the third side plate 1123 away from the connection plate 111 are respectively coupled to edges of the fourth side plate. The connection frame 11 is box-shaped as a whole. The magnetic member 20 is placed in the connection frame 11 from an opening on one side of the connection frame 11 away from the first side plate 1121, so as to prevent the magnetic member 20 from leaving the connection frame 11.

In one example, a surface of the insulation layer at the outer side of the magnetic member 20 is plated with a metal layer. The magnetic member 20 is configured to be electrically coupled to the conductive wire 120. When the magnetic member 20 is adsorbed to a surface of the electrode member 110, current flows to the conductive wire 120 via the magnetic member 20, so as to avoid the demagnetization of the magnetic member 20 when the current flows to the magnetic member 20.

In another example, the magnetic member 20 is secured to the conductive wire 120. For example, the magnetic member 20 is welded with cables on one end of the conductive wire 120. Alternatively, the magnetic member 20 defines a screw hole on a surface of the magnetic member 20, the cables of the conductive wire 120 can be received in the screw hole, that is, the cables of the conductive wire 120 can be fixed in the screw hole by screwing a screw into the screw hole, so as to achieve the fixed coupling between the magnetic member 20 and the conductive wire 120. After testing, the surface of the magnetic member 20 can be in direct contact with the electrode member 110, so as to realize current conduction.

Figure 4:
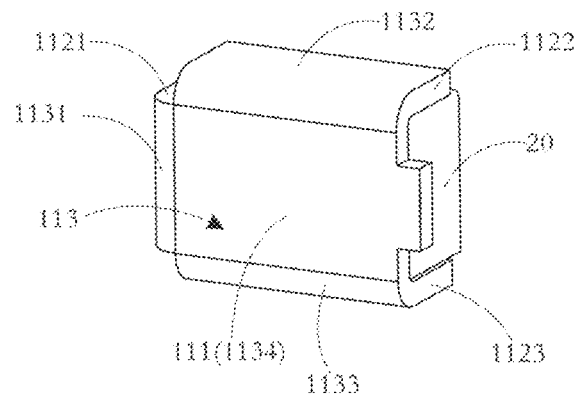
FIG. 4 is an assembled perspective view illustrating a connection frame and a magnetic member of the conductive terminal in FIG. 1.

FIG. 4 is an assembled perspective view illustrating the connection frame 11 and the magnetic member 20 of the conductive terminal 100 in FIG. 1.

As illustrated in FIG. 4, a side surface of the first side plate 1121, a side surface of the second side plate 1122, a side surface of the third side plate 1123, and a side surface of the connection plate 111 away from the magnetic member 20 are all conductive surfaces 113.

In one example, the conductive surfaces 113 include a first surface 1131 of the first side plate 1121 away from the magnetic member 20, a second surface 1132 of the second side plate 1122 away from the magnetic member 20, a third surface 1133 of the third side plate 1123 away from the magnetic member 20, and a fourth surface 1134 of the connection plate 111 away from the magnetic member 20.

As illustrated in FIG. 2 to FIG. 4, the electrode member 110 can be electrically coupled to at least one of the first surface 1131, the second surface 1132, the third surface 1133, or the fourth surface 1134 of the connection frame 11, such that current can flow to the conductive member 10 via the conductive surface 113, and then flow to the outside via the conductive wire 120. The conductive surface 113 is generally formed by adopting a copper plating process to facilitate current conduction between the conductive surface 113 and the electrode member 110 without affecting magnetic adsorption.

In another example, the conductive surfaces 113 further include at least one of a surface of the first side plate 1121 away from the connection plate 111, a surface of the second side plate 1122 away from the connection plate 111, a surface of the third side plate 1123 away from the connection plate 111, or a surface of the magnetic member 20 away from the connection plate 111.

In yet another example, surfaces of the connection frame 11 and surfaces of the magnetic member 20 are all the conductive surfaces 113, that is, after the magnetic member 20 is received in the receiving groove 13, all exposed surfaces of the connection frame 11 and the magnetic member 20 can be used as the conductive surfaces 113.

In another example, the connection frame 11 further includes a fourth side plate facing the connection plate 111. The fourth side plate is arranged at the opening of the receiving groove 13. The fourth side plate is secured to one side of the first side plate 1121 away from the connection plate 111, one side of the second side plate 1122 away from the connection plate 111, and one side of the third side plate 1123 away from the connection plate 111. Exposed surfaces of the first side plate 1121, the second side plate 1122, the third side plate 1123, the fourth side plate, and the connection plate 111 are all conductive surfaces 113. That is, when the connection frame 11 completely wraps the magnetic member 20, all outer surfaces of the connection frame 11 can be used as the conductive surfaces 113.

According to implementations, by arranging the conductive surface 113 to be away from the magnetic member 20, the influence of the current on the magnetic member 20 can be avoided. With aid of the magnetic property of the magnetic member 20, the coupling between the conductive terminal 100 and the electrode member 110 can be achieved, which improves the efficiency of the coupling between the conductive terminal 100 and the electrode member 110, thereby further improving the safety of use of the conductive terminal 100.

Figure 5:
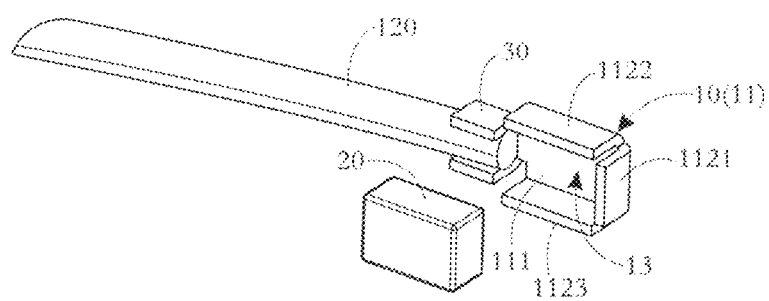
FIG. 5 is an exploded, perspective view of the conductive terminal in FIG. 1.

FIG. 5 is an exploded, perspective view of the conductive terminal 100 in FIG. 1.

As illustrated in FIG. 3 and FIG. 5, in one example, a fixing member 30 is arranged at a connection between the connection frame 11 and the conductive wire 120. The fixing member 30 is secured to the connection frame 11, to protect the end of the conductive wire 120 coupled to the conductive member 10, and to conduct current between the conductive member 10 and the conductive wire 120.

The fixing member 30 is configured to be electrically coupled to the end of the conductive wire 120. In one example, the fixing member 30 is disposed at one end of the connection plate 111 away from the first side plate 112. The fixing member 30 includes a fixing piece 31 coupled to the connection plate 111 and two positioning pieces 32 respectively arranged on two opposite sides of the fixing piece 31.

The fixing piece 31 and the two positioning pieces 32 collectively define a positioning groove 33, and the positioning groove 33 is used for receiving the end of the conductive wire 120.

In one example, the fixing piece 31 and the two positioning pieces 32 are integrally formed, and the overall shape is in a "C" shape. The fixing piece 31 is secured to a side surface of the connection plate 111 away from the first side plate 1121, and the fixing piece 31 extends toward the conductive wire 120. The two positioning pieces 32 extend from the two opposite sides of the fixing piece 31 and extend toward the same side of the fixing member 30. The positioning groove 33 is generally used for receiving or clamping the metal cable inside the conductive wire 120, and the metal cables are twined at a connection gap between the fixing piece 31 and the connection plate 111.

In one example, a distance between the two positioning pieces 32 disposed at two ends of the fixing member 30 corresponds to an outer diameter of the conductive wire 120. The both ends of the fixing member 30 are clamped on the outer circumferential surface of the conductive wire 120, so that the metal cable inside the conductive wire 120 can be twined at the connection gap between the fixing piece 31 and the connection plate 111, to achieve the electrically coupling between the conductive wire 120 and the connection plate 111.

The fixing member 30 may be arranged around the conductive wire 120 to form a fixing ring, and one side of the fixing ring facing the connection frame 11 is secured to the connection frame 11.

In another example, the fixing member 30 and the connection frame 11 may be integrally formed by punching and bending a whole plate.

In the implementation, by fixing the conductive wire 120 with the fixing member 30, strength of the coupling between the conductive wire 120 and the connection frame 11 can be enhanced, and thus discoupling between the conductive wire 120 and the connection frame 11 due to repeated bending can be avoided, thereby making the conductive terminal 100 relatively reliable and improving the usability of the conductive wire 120 suitable for the conductive terminal 100.

As illustrated in FIG. 5, during assembling of the conductive terminal 100, one end of the conductive wire 120 is electrically coupled to one end of the connection plate 111 away from the first side plate 1121, and then both ends of the fixing member 30 are clapped on the outer circumferential surface of the conductive wire 120 to prevent bending of the conductive wire 120 at the connection between the conductive wire 120 and the connection plate 111. Thereafter, the magnetic member 20 is placed in the receiving groove 13 of the connection frame 11, and tilt angles of the first side plate 1121, the second side plate 1122, and the third side plate 1123 are adjusted so that the first side plate 1121, the second side plate 1122, and the third side plate 1123 can clamp the magnetic member 20 in the receiving groove 13.

As illustrated in FIG. 2 and FIG. 4, during use of the conductive terminal 100, the conductive surface 113 of the connection frame 11 is close to the electrode member 110, and then the connection frame 11 is adsorbed to the surface of the electrode member 110 due to the adsorption force of the magnetic member 20, so that the conductive surface 113 is in contact with the surface of the electrode member 110 to conduct current. The current flows to the conductive surface 113 of the connection frame 11 via the surface of the electrode member 110, and then flows to the conductive wire 120 via the conductive surface 113. Alternatively, the current flows to the connection frame 11 via the conductive wire 120, and then flows to the electrode member 110 via the conductive surface 113 of the connection frame 11.

Figure 6:
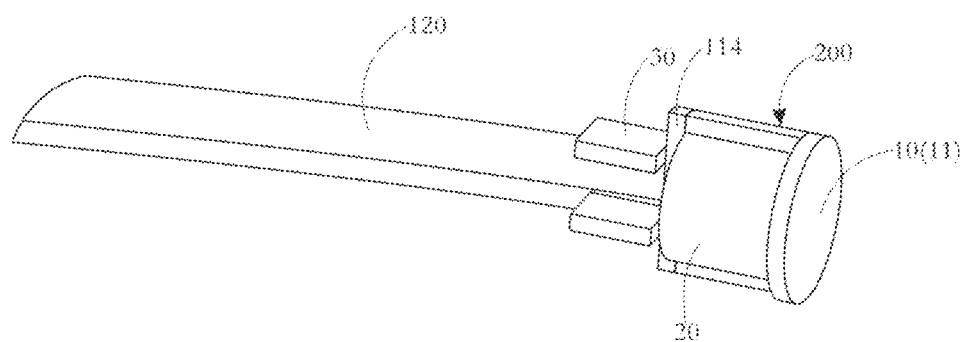
FIG. 6 is a perspective view of a conductive terminal according to other implementations of the disclosure.
Figure 7:
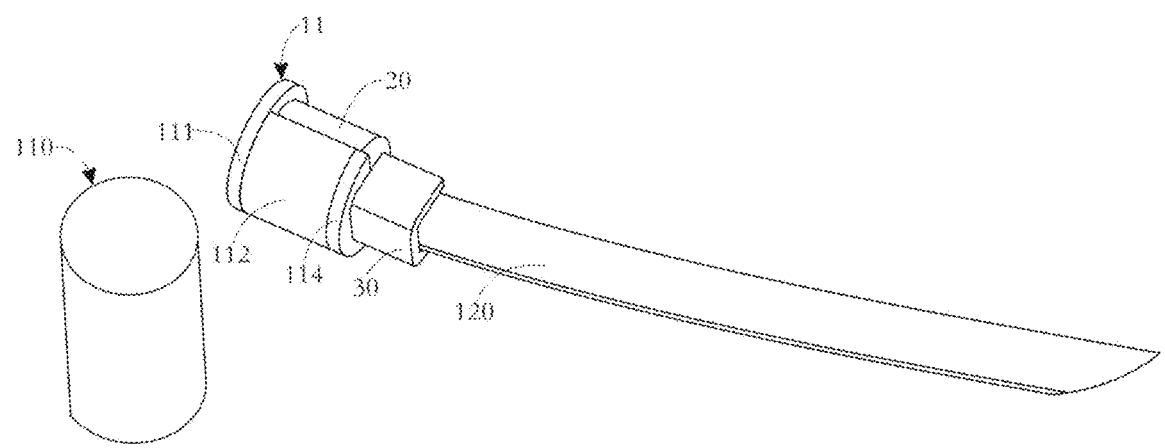
FIG. 7 is a perspective view of the conductive terminal in FIG. 6 and an electrode member.
Figure 8:
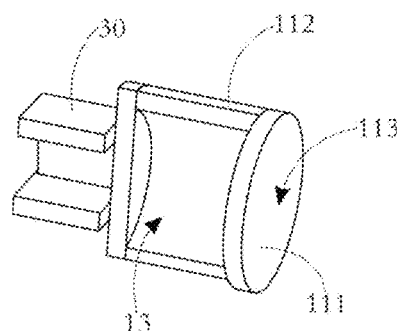
FIG. 8 is a perspective view of a connection frame of the conductive terminal in FIG. 6.
Figure 9:
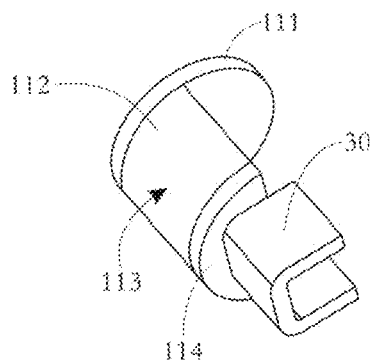
FIG. 9 is a perspective view of the connection frame of the conductive terminal in FIG. 6, viewed from another viewpoint.

FIG. 6 is a perspective view of a conductive terminal 200 according to other implementations of the disclosure. FIG. 7 is a perspective view of the conductive terminal 200 in FIG. 6 and the electrode member 110. FIG. 8 is a perspective view of a connection frame 11 of the conductive terminal 200 in FIG. 6. FIG. 9 is a perspective view of the connection frame 11 of the conductive terminal 200 in FIG. 6, viewed from another viewpoint.

As illustrated in FIG. 6 to FIG. 9, the conductive terminal 200 is provided in a second implementation of the disclosure. The structure of the conductive terminal 200 is similar to that of the conductive terminal 100 in the above implementation. The conductive terminal 200 and the conductive terminal 100 are different in structures of the connection frame 11 and the magnetic member 20.

As illustrated in FIG. 7 and FIG. 8, in the implementation, the connection frame 11 includes a connection plate 111, a side plate 112 arranged around the connection plate 111, and a fixing member 30 disposed on one side of the side plate 112 away from the connection plate 111. The connection plate 111, the side plate 112, and the fixing member 30 define a receiving groove 13 for receiving the magnetic member 20. The fixing member 30 is electrically coupled to an end of the conductive wire 120.

The one side of the side plate 112 of the connection frame 11 is coupled to the conductive wire 120, the connection plate 111 is arranged opposite to the end of the conductive wire 120, and the other side of the side plate 112 away from the conductive wire 120 is secured to the connection plate 111.

The magnetic member 20 is cylindrical and located between the connection plate 111 and the conductive wire 120. One end surface of the magnetic member 20 faces a plate surface of the connection plate 111, and the other end surface of the magnetic member 20 faces the conductive wire 120.

The plate surface of the connection plate 111 is circular, that is, the connection plate is a circular plate. The plate surface of the connection plate 111 is arranged opposite to an end surface of the conductive wire 120.

The side plate 112 is an arc-shaped plate with an arc-shaped plate surface. The radian of the plate surface of the side plate 112 corresponds to that of a circumferential surface of the magnetic member 20. The other side of the side plate 112 away from the conductive wire 120 is secured to an edge of the connection plate 111. That is, the side plate 112 extends along a circumferential direction of the connection plate 111, and an opening is defined between two opposite side edges of the side plate 112.

In one example, a baffle plate 114 is provided on the one side of the side plate 112 away from the connection plate 111. A plate surface of the baffle plate 114 is arranged in parallel with that of the connection plate 111. The fixing member 30 is disposed on one side of the baffle plate 114 away from the side plate 112.

As illustrated in FIG. 6 to FIG. 9, the side plate 112, the baffle plate 114, and the connection plate 111 define a receiving groove 13. The receiving groove 13 is used for receiving the magnetic member 20. The magnetic member 20 is placed in the receiving groove 13 from the opening of the side plate 112.

A side surface of the side plate 112 and a side surface of the connection plate 111 away from the magnetic member 20 in the receiving groove 13 are both conductive surfaces 113.

The conductive surface 113 is configured to be electrically coupled to the electrode member 110.

In one example, the baffle plate 114 defines a hole at a position of the baffle plate 114 facing the conductive wire 120, which is convenient for the conductive wire 120 to pass through the hole on the baffle plate 114 to be electrically coupled to the side plate 112.

In another example, the side plate 112 is cylindrical. The inner diameter of the side plate 112 corresponds to the diameter of the magnetic member 20 so that the magnetic member 20 can be received in the side plate 112.

In one example, the baffle plate 114 is secured to and electrically coupled to the side plate 112. The baffle plate 114 is configured to be electrically coupled to the conductive wire 120.

As can be seen, the baffle plate 114 is provided in the conductive terminal 200, such that on one hand the magnetic member 20 is spaced apart from the conductive wire 120 to avoid the demagnetization of the magnetic member 20 caused by that the current flows to the magnetic member 20 when the conductive wire 120 is in contact with the magnetic member 20, and on the other hand the magnetic member 20 is prevented from leaving the receiving groove 13. With such configuration, the usability of the conductive terminal 200 can be improved, so that the conductive terminal 200 can be suitable for the electrode member 110 with a plane or curved surface.

Figure 10:
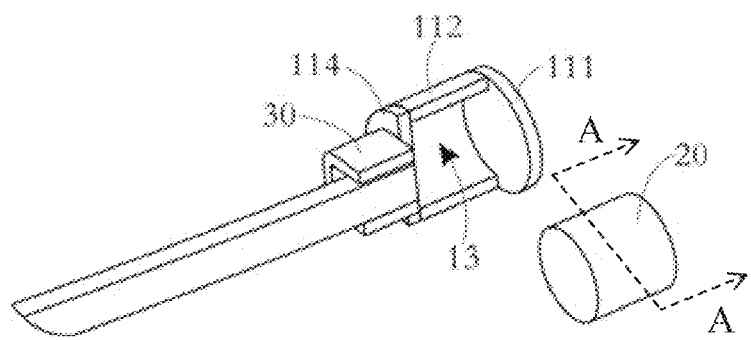
FIG. 10 is an exploded, perspective view of the conductive terminal in FIG. 6.

FIG. 10 is an exploded, perspective view of the conductive terminal 200 in FIG. 6. As illustrated in FIG. 10, in the second implementation of the disclosure, during assembling of the conductive terminal 200, one end of the conductive wire 120 is electrically coupled to the side plate 112 by bypassing or passing through the baffle plate 114, and then the both ends of the fixing member 30 are clamped on the outer circumferential surface of the conductive wire 120 to prevent bending of the conductive wire 120 at the connection between the conductive wire 120 and the connection frame 11. Thereafter, the magnetic member 20 is placed in the receiving groove 13 such that the inner wall of the side plate 112 is attached to the circumferential surface of the magnetic member 20, where one side surface of the baffle plate 114 facing the receiving groove 13 faces one end surface of the magnetic member 20, and one side surface of the connection plate 111 facing the receiving groove 13 faces the other end surface of the magnetic member 20.

As illustrated in FIG. 7 to FIG. 9, during use of the conductive terminal 200, the conductive surface 113 of the connection frame 11 is close to the electrode member 110, and then the conductive surface 113 of the connection frame 11 is adsorbed to the surface of the electrode member 110 due to the adsorption force of the magnetic member 20. In such case, the current can flow from the electrode member 110 to the conductive surface 113, and then flow to the conductive wire 120 via the conductive surface 113.

Figure 12:
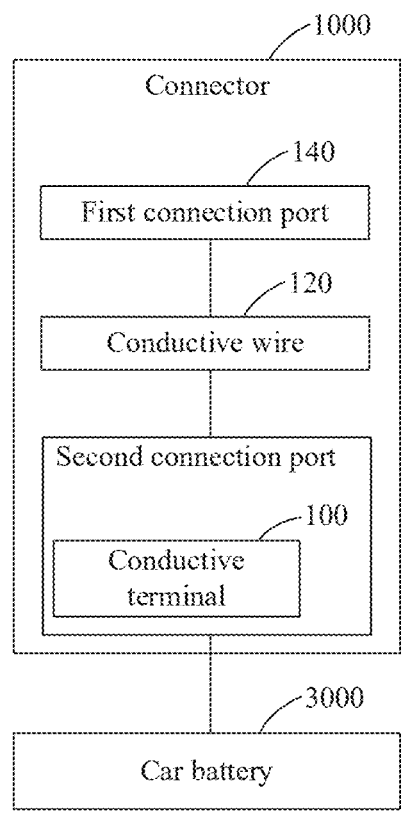
FIG. 12 is a schematic block view of a connector according to implementations of the disclosure.

As illustrated in FIG. 12, implementations of the disclosure further provide a connector 1000. The connector 1000 includes a conductive wire 120, a first connection port 140 located at one end of the conductive wire 120, and a second connection port located at the other end of the conductive wire 120. The first connection port 140 is coupled to an output port of a starting power supply, and the second connection port is configured to be electrically coupled to a car battery 3000. The second connection port includes the conductive terminal 100, 200 described in any implementation of the disclosure. The conductive terminal is configured to be electrically coupled to an electrode member of the car battery.

The starting power supply in the connector is generally an emergency starting power supply, and the car battery is generally a car storage battery. One end of the conductive wire of the connector is coupled to a current output port of the emergency starting power supply, and the other end of the conductive wire is coupled to the conductive terminal. During use of the connector, the conductive terminal is coupled to positive and negative electrodes of the car battery, and thus the current can flow from the emergency starting power supply to the car battery, to activate the car battery by outputting current to the car battery so as to supply power to the car.

Figure 13:
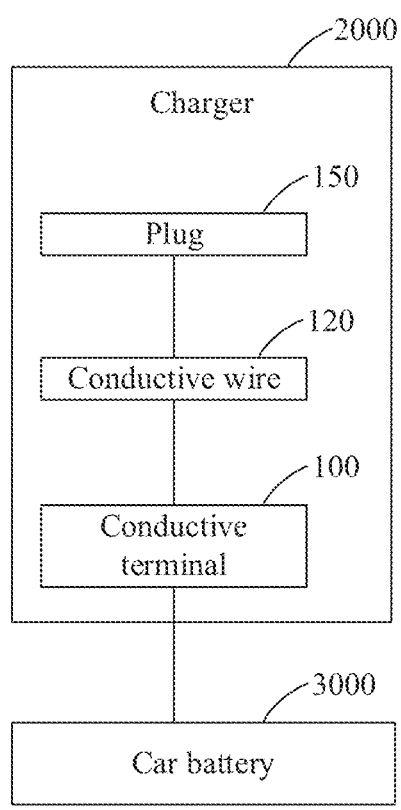
FIG. 13 is a schematic block view of a charger according to implementations of the disclosure.

As illustrated in FIG. 13, implementations of the disclosure further provide a charger 2000 for charging a car battery 3000. The charger 2000 includes a plug 150, a conductive wire 120, and the conductive terminal 100, 200 described in any implementation of the disclosure. One end of the conductive wire 120 of the charger 2000 is coupled to the plug 150, and the other end of the conductive wire 120 is coupled to the conductive terminal 100, 200. The plug is configured to be coupled to an external charging power supply (such as a household power supply of 220V). The conductive terminal is configured to be electrically coupled to an electrode member of the car battery to charge the car battery.

The car battery is generally a car storage battery. During charging of the car battery, the conductive terminal is adsorbed to positive and negative electrode members of the car battery, and then the plug of the charger is coupled to the household power supply of 220V, such that the current can flow from the plug to the conductive terminal via the conductive wire, and then flow to the electrode member via the conductive terminal, so as to charge the car battery.

Implementations of the disclosure further provide an emergency starting power supply. The emergency starting power supply includes a conductive wire, an energy storage device coupled to one end of the conductive wire, and the conductive terminal described in any implementation of the disclosure. The conductive terminal is disposed at one end of the conductive wire away from the energy storage device. The conductive terminal is configured to be electrically coupled to an electrode member of a car battery. The emergency starting power supply is configured to deliver current to the car battery via the conductive terminal.

The emergency starting power supply is integrated. During use of the emergency starting power supply, the conductive terminal of the emergency starting power supply is adsorbed to the positive and negative electrode members of the car battery, such that the starting power supply can deliver starting current to the car battery via the conductive terminal, thereby starting the car battery to supply power to the car.

As illustrated in FIG. 1 to FIG. 10, the disclosure provides the conductive terminal, the connector, the charger, and the emergency starting power supply. The conductive terminal includes the magnetic member 20 and the conductive member 10. The conductive member 10 includes the connection frame 11, and the connection frame 11 is used for receiving the magnetic member 20. The magnetic member 20 can drive the connection frame 11 to be adsorbed to the electrode member 110 by magnetic adsorption force, so that the current can flow from the electrode member 110 to the conductive wire 120 via the connection frame 11. That is, the magnetic member 20 provides a guiding force for the coupling between the conductive member 10 and the electrode member 110, which improves the efficiency of the coupling between the conductive terminal and the electrode member 110, so that plugging between the conductive terminal and the electrode member 110 is relatively convenient. In addition, there is no need to manually hold the conductive terminal to realize the coupling between the conductive terminal and the electrode member 110, such that the safety of the use of the conductive terminal can be improved.

The foregoing illustrates some implementations of the disclosure. It should be pointed out that for those of ordinary skill in the art, various improvements and modifications can be made without departing from the principle of the implementations of the disclosure. These improvements and modifications also deemed to fall within the scope of protection of the disclosure.

What is claimed is:

1. A conductive terminal, configured to be disposed at an end of a conductive wire and electrically coupled to an electrode member, the conductive terminal comprising:
 a conductive member comprising a connection frame configured to be electrically coupled to the conductive wire; and
 a magnetic member received in the connection frame; wherein
 the connection frame comprises a connection plate and side plates protruding from edges of the connection plate, wherein the connection plate and the side plates define a receiving groove, and the magnetic member is received in the receiving groove; and
 the connection plate extends toward the conductive wire, and one side of the connection plate is configured to be electrically coupled to the conductive wire, wherein a first side plate protrudes from a side edge of the connection plate away from the conductive wire, and a second side plate and a third side plate respectively protrude from two opposite sides of the connection plate arranged between the first side plate and the conductive wire, wherein the first side plate, the second side plate, the third side plate, and the connection plate cooperatively define the receiving groove.

2. The conductive terminal of claim 1, wherein the magnetic member comprises a magnet and an insulation layer wrapping the magnet, wherein the insulation layer is configured to isolate current conduction between the magnet and the conductive member.

3. The conductive terminal of claim 1, wherein a side surface of the connection frame away from the magnetic member is configured to be electrically coupled to the electrode member, to enable that current flows to the conductive member via the conductive wire and flow to the electrode member via the conductive member.

4. The conductive terminal of claim 1, wherein the connection frame completely wraps the magnetic member, and outer surfaces of the connection frame are all conductive surfaces.

5. The conductive terminal of claim 1, wherein the magnetic member is received in the receiving groove, and surfaces of the connection frame and surfaces of the magnetic member are all conductive surfaces.

6. The conductive terminal of claim 1, wherein a side surface of the first side plate away from the magnetic member, a side surface of the second side plate away from the magnetic member, a side surface of the third side plate away from the magnetic member, and a side surface of the connection plate away from the magnetic member are all conductive surfaces.

7. The conductive terminal of claim 1, wherein the connection frame is provided with a fixing member, wherein the fixing member is configured to be electrically coupled to the end of the conductive wire.

8. The conductive terminal of claim 7, wherein the fixing member is disposed at one end of the connection plate away from the first side plate, wherein the fixing member comprises a fixing piece coupled to the connection plate and two positioning pieces respectively arranged on two opposite sides of the fixing piece, wherein the fixing piece and the two positioning pieces define a positioning groove for receiving the end of the conductive wire.

9. A connector, comprising:
 a conductive wire;
 a first connection port located at one end of the conductive wire; and
 a second connection port located at the other end of the conductive wire, wherein the first connection port is coupled to an output port of a starting power supply, and the second connection port is configured to be coupled to a car battery, wherein the second connection port comprises a conductive terminal, and the conductive terminal is configured to be electrically coupled to an electrode member of the car battery, wherein
 the conductive terminal comprises:
 a conductive member comprising a connection frame configured to be electrically coupled to the conductive wire; and
 a magnetic member received in the connection frame; wherein
 the connection frame comprises a connection plate and side plates protruding from edges of the connection plate, wherein the connection plate and the side plates define a receiving groove, and the magnetic member is received in the receiving groove; and
 the connection frame is provided with a fixing member, wherein the fixing member is configured to be electrically coupled to the end of the conductive wire.

10. The connector of claim 9, wherein the magnetic member comprises a magnet and an insulation layer wrapping the magnet, wherein the insulation layer is configured to isolate current conduction between the magnet and the conductive member.

11. The connector of claim 9, wherein a side surface of the connection frame away from the magnetic member is configured to be electrically coupled to the electrode member, to enable that current flows to the conductive member via the conductive wire and flow to the electrode member via the conductive member.

12. The connector of claim 9, wherein the connection frame completely wraps the magnetic member, and outer surfaces of the connection frame are all conductive surfaces.

13. The connector of claim 9, wherein the magnetic member is received in the receiving groove, and surfaces of the connection frame and surfaces of the magnetic member are all conductive surfaces.

14. The connector of claim 9, wherein the connection plate extends toward the conductive wire, and one side of the connection plate is configured to be electrically coupled to the conductive wire, wherein a first side plate protrudes from a side edge of the connection plate away from the conductive wire, and a second side plate and a third side plate respectively protrude from two opposite sides of the connection plate arranged between the first side plate and the conductive wire, wherein the first side plate, the second side plate, the third side plate, and the connection plate cooperatively define the receiving groove.

15. The connector of claim 14, wherein a side surface of the first side plate away from the magnetic member, a side surface of the second side plate away from the magnetic member, a side surface of the third side plate away from the magnetic member, and a side surface of the connection plate away from the magnetic member are all conductive surfaces.

16. The connector of claim 9, wherein the fixing member is disposed at one end of the connection plate away from the first side plate, wherein the fixing member comprises a fixing piece coupled to the connection plate and two positioning pieces respectively arranged on two opposite sides of the fixing piece, wherein the fixing piece and the two positioning pieces define a positioning groove for receiving the end of the conductive wire.

17. A charger for charging a car battery, the charger comprising:
  a plug;
  a conductive wire; and
  a conductive terminal, wherein one end of the conductive wire is coupled to the plug, and the other end of the conductive wire is coupled to the conductive terminal, wherein the plug is configured to be coupled to an external charging power supply, and the conductive terminal is configured to be electrically coupled to an electrode member of the car battery to charge the car battery, wherein
  the conductive terminal comprises:
  a conductive member comprising a connection frame configured to be electrically coupled to the conductive wire; and
  a magnetic member received in the connection frame; wherein
  the connection frame comprises a connection plate, a side plate arranged around the connection plate, and a fixing member disposed on one side of the side plate away from the connection plate, wherein the connection plate, the side plate, and the fixing member define a receiving groove for receiving the magnetic member, and the fixing member is configured to be electrically coupled to the end of the conductive wire.

18. The charger of claim 17, wherein the magnetic member comprises a magnet and an insulation layer wrapping the magnet, wherein the insulation layer is configured to isolate current conduction between the magnet and the conductive member.

19. The charger of claim 17, wherein at least one of a surface of the side plate away from the magnetic member or a surface of the connection plate away from the magnetic member is a conductive surface, wherein the conductive surface is configured to be electrically coupled to the electrode member.

20. The charger of claim 19, wherein the connection plate is a circular plate, the side plate extends along a circumferential direction of the circular plate and an opening is defined between two opposite side edges of the side plate, and the magnetic member is received in the receiving groove from the opening.

* * * * *